United States Patent [19]
Narita

[11] Patent Number: 5,749,940
[45] Date of Patent: May 12, 1998

[54] METHOD FOR PRODUCING HIGH GRADE REDUCED SILVER

[75] Inventor: Katutoshi Narita, Ibaraki, Japan

[73] Assignee: Nippon Mining & Metals Co., Inc., Tokyo, Japan

[21] Appl. No.: 814,235

[22] Filed: Mar. 11, 1997

[30] Foreign Application Priority Data

May 27, 1996 [JP] Japan ................. 8-131928

[51] Int. Cl.$^6$ ................. C22B 11/00
[52] U.S. Cl. ................. 75/711; 75/711; 75/710; 75/392; 420/501
[58] Field of Search ............... 75/711, 710, 392; 420/501

[56] References Cited

U.S. PATENT DOCUMENTS 2,060,539  5/1936  Spies ................. 23/216
4,094,668  6/1978  Yannopoulos et al. ................. 75/99
4,229,270  10/1980  Subramanian et al. ................. 204/109

*Primary Examiner*—David A. Simmons
*Assistant Examiner*—M. Alexandra Elve
*Attorney, Agent, or Firm*—Birch, Stewart, Kolasch & Birch, LLP

[57] ABSTRACT

The known method comprises the following steps. (1) the de-copperized anode slime is chlorination-leached with HCl and $H_2O_2$. (2) $Na_2CO_3$ is added to the chlorination-leach residue of (1). (3) $NH_3$ is added to the residue of (2). (4) Distillation of $NH_3$ to remove $NH_3$ contained in the ammonia leach solution of (3). (5) Distillation residue is washed with water to yield refined AgCl. (6) Conversion of AgCl to $Ag_2O$. (7) Reduction of $Ag_2O$ to Ag. In order to enhance the purity of the reduced silver, the present invention provides the following improvements (a) to (d). (a) Dechlorination (2) with the use of $Na_2CO_3$ is carried out at ambient temperature. (b) After dechlorination, the residue is washed with hot water. (c) Sulfuric acid is added instead of carrying out distillation (4). (d) Prior to conversion (6), the chlorination is again carried out.

6 Claims, 2 Drawing Sheets

METHOD FOR PRODUCING HIGH GRADE REDUCED SILVER

BACKGROUND OF INVENTION

1. Field of Invention

The present invention relates to a method for producing a high-grade reduced silver from crude silver chloride which contains gold, palladium, copper, lead and tellurium. More particularly, the present invention relates to a method for producing high-grade reduced silver from de-copperized anode slime which is produced in copper electrorefining process.

2. Description of Related Arts

Conventionally, reduced silver is produced through many steps as illustrated in FIG. 1 from the de-copperized anode slime. The steps are mentioned as following.

The de-copperized anode slime is leached by adding hydrochloric acid and hydrogen peroxide in the chlorination leaching step and the subsequent liquor is separated into solution and chlorination leach-residue.

In the de-chlorination step, sodium carbonate is added to the liquor, which contains chlorination leach-residue, at a temperature of approximately 70° C., and the leach liquor is then separated into the dechlorinated residue and the dechlorination leach solution.

In the ammoniacal leaching step, ammonia is added to the liquor, which contains dechlorinated residue, and the leach liquor is then separated into the leach solution and the leach residue.

In the ammonia distillation step, the leach solution from the ammoniacal leaching step is heated to high temperature to remove ammonia from the leach solution as a gas, and subsequent distillation residue is washed with water in the water-washing step to yield the refined silver chloride.

In the silver oxide (I) conversion step, sodium hydroxide is added to the liqour, which contains silver chloride, to convert silver chloride to silver oxide (I). A reductant, such as reducing sugar or hydrazine is added to the slurry of silver oxide (I) to reduce silver oxide (I) to Ag. The reducing step is followed by the water-washing and then filtration steps. The reduced silver is produced from the crude silver chloride as described above.

However, gold, palladium, copper, lead and tellurium remain as impurities in the reduced silver produced through the above-mentioned method. This method is unable to produce a high-grade silver with a silver content of more than 99.99% by weight, i.e., 1 ppm or less of each impurity such as gold, palladium, copper, lead and tellurium contained.

SUMMARY OF INVENTION

An object of the present invention is, therefore, to provide a method for producing a high-grade reduced silver in an operationally simple process.

The present inventor carried out extensive studies and discovered that the main impurities of the crude silver chloride, which are gold, palladium, copper, lead and tellurium, can be decreased to less than 1 ppm each, and a high-grade reduced silver can be produced by the following measures.

(1) Dechlorination of the crude silver chloride is to be carried out at ambient temperature.

(2) Washing of the crude silver chloride after the dechlorination is to be carried out with hot water.

(3) Instead of heating the ammoniacal leach solution to high temperature to remove ammonia as gas, sulfuric acid is to be added to the ammoniacal leach solution to neutralize ammonium ions.

(4) Prior to converting silver chloride to silver oxide (I), hydrochloric acid and hydrogen peroxide are to be again used for the chlorination leaching and the washing is then to be carried out.

In accordance with the objects of the present invention, there is provided a method for producing high-grade reduced silver from crude silver chloride, which is prepared by chlorination leaching of de-copperized anode slime, comprising the steps of:

- adding hydrochloric acid and hydrogen peroxide to a liquor which contains the de-copperized anode slime, and separating a first chlorination leach residue and a first chlorination leach solution from one another;
- adding sodium carbonate to the first chlorination leach residue at ambient temperature, thereby dechlorinating the first chlorination leach residue and separating a dechlorinated residue and a leach solution from one another;
- adding ammonia to the dechlorinated residue, and separating a leach residue and an ammoniacal leach solution from one another;
- adding sulfuric acid to the ammoniacal leach solution to neutralize the ammoniacal leach solution and forming precipitate mainly composed of silver chloride;
- adding hydrochloric acid and hydrogen peroxide to the precipitate, and separating a second chlorination-leach residue which essentially consists of silver chloride, and a second chlorination leach solution, from one another;
- obtaining a slurry of the second chlorination-leach residue;
- adding sodium hydroxide to the slurry of the second chlorination-leach residue to convert the silver chloride to silver oxide (I); and,
- adding a reductant, such as reducing sugar or hydrazine to reduce silver oxide (I) in the slurry to silver.

Preferably, prior to the step of ammoniacal-leaching the dechlorinated residue with a solution of aqueous ammonia and then separating the leach residue and the ammoniacal leach solution from one another, the dechlorinated residue is washed with hot water. Preferably, the pH value of the ammoniacal leach solution is adjusted to 7 or less to produce the silver chloride as precipitate.

Embodiments of the present invention are described with reference to FIG. 2.

DESCRIPTION OF PREFERRED EMBODIMENTS

Figure 1:
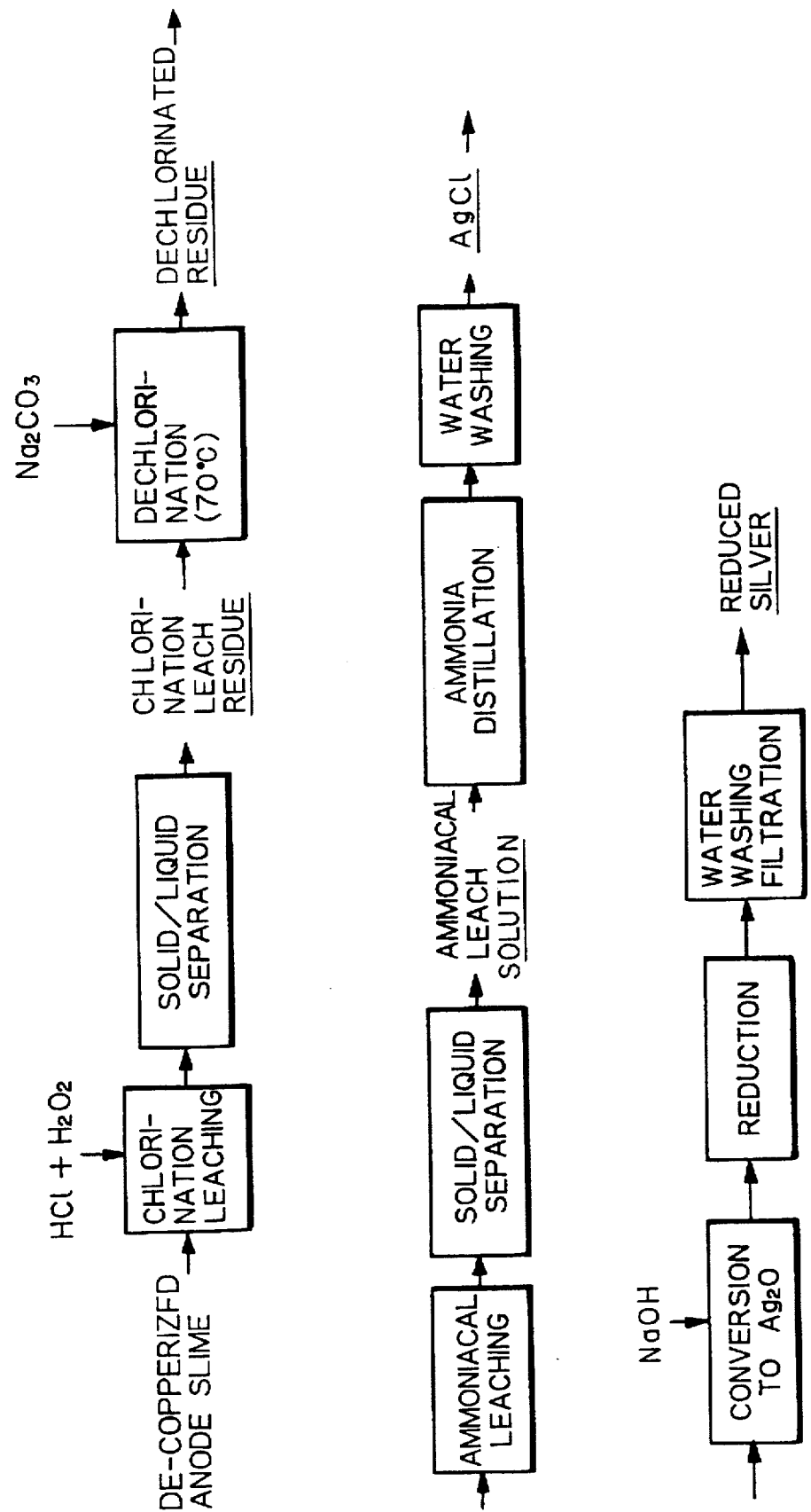
FIG. 1 is a flow chart illustrating a conventional method for producing reduced silver.
Figure 2:
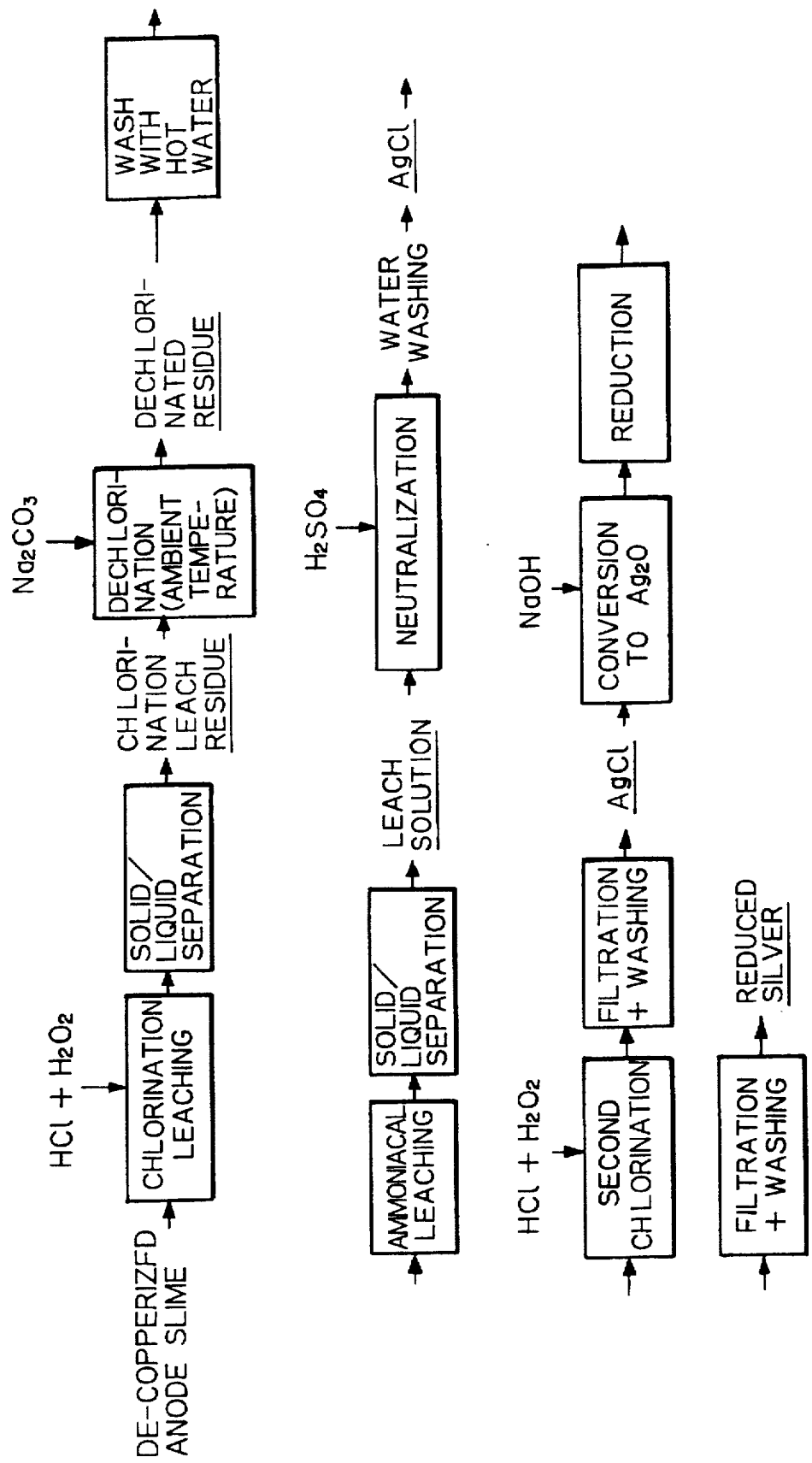
FIG. 2 is a flow chart illustrating an embodiment of the method for producing reduced silver.

Stage 1. This stage comprises chlorination leaching of de-copperized anode slime with hydrochloric acid and hydrogen peroxide and separation of leach solution and residue after the chlorination leaching.

De-copperized anode slime, which contains gold, palladium, copper, lead and tellurium, is leached with hydrochloric acid and hydrogen peroxide to extract precious metals into the leach solution. Usual filtration such as a press filter is applied for separating the leach solution and the residue after the chlorination leaching.

Stage 2. This stage comprises de-chlorine treatment of the residue that is gained in Stage 1 with sodium carbonate. which is in the form of powder or a slurry, and separation of the solution and residue after the treatment.

A characteristic of this stage is to perform the de-chlorine treatment of the components in the de-copperized anode slime, particularly lead, at an ambient temperature. An ambient temperature is not strictly defined but it usually means a temperature approximately from 10° to 30° C. in most case through the year.

Lead chloride in the chlorination residue reacts with sodium carbonate and is converted to lead carbonate according to the following equation.

$$PbCl_2 + Na_2Co_3 \rightarrow PbCO_3 + 2NaCl$$

This reaction is likely to proceed act an ambient temperature rather than high temperature, while a part of lead chloride is easily converted to $2PbCO_3 \cdot Pb(OH)_2$ with sodium carbonate. $2PbCO_3 \cdot Pb(OH)_2$ is relatively soluble compared to lead carbonate in a solution of aqueous ammonia that is employed to dissolve silver chloride in the next stage and hence the purity of the reduced silver chloride is lowered. Usual filtration such as a press filter is applied for separating the leach solution and the residue after the chlorination leaching.

Stage 3. This stage comprises ammoniacal leaching to the dechlorinated residue.

Stage 4. This stage comprises neutralization of the ammonia solution after Stage 3 with sulfuric acid to produce precipitate consisting essentially of silver chloride.

A characteristic of this stage is that neutralization with sulfuric acid is employed instead of ammonia distillation to remove ammonia from the solution. Sulfuric acid is added into the ammonia solution till preferably pH value of the solution is equal to or less than 7. The neutralization produces ammonium sulfate and silver chloride according to the following equation.

$$Ag(NH_3)_2Cl + H_2SO_4 \rightarrow (NH_4)_2SO_4 + AgCl.$$

Ammonium sulfate solution and the precipitate which essentially consists of silver chloride are gained after filtration. An additional advantage of the neutralization is to prevent the formation of $Ag_3N$ (fulminating silver).

The particle size of silver chloride formed by the neutralization is finer than that by ammonia distillation. The second chlorination leaching which is applied in the next stage more effectively works on the fine crystalline silver chloride such as that formed by the neutralization.

The silver chloride formed in this stage is washed with water.

Stage 5. This stage comprises the second chlorination leaching after Stage 4.

Before Stage 5, sulfuric acid is added to the leach soutionto neutralize and hence to form precipitates mainly composed of silver chloride. Chlorination carried out in Stage 5 comprises adding hydrochloric acid and hydrogen peroxide. The silver chloride residue formed in Stage 4 is pulped in water and sodium hydroxide is added to convert silver chloride to silver oxide (I). This second chlorination leaching is not employed in the conventional method. The second chlorination leaching extracts remained impurities in the silver chloride in the preceding stage.

Stage 6. This stage comprises the conversion of silver chloride to silver oxide (I).

This stage is employed in the conventional method and performed at the temperature of higher than 95° C.

Stage 7. This stage comprises the reduction of the silver oxide (I) to silver with reductant after the conversion of silver chloride to silver oxide (I).

A reductant such as reducing sugar or hydrazine is added to the silver oxide (I) slurry. The reduced silver formed in this stage is separated by filtration and washed with water.

The present invention is hereinafter described with reference to the drawings.

EXAMPLE 1

1220 g of anode slime, which is de-copperized in an autoclave, was used as a crude silver chloride and was treated as follows.

Stage 1. A slurry containing the crude silver chloride and 540 g of HCl was prepared. 391 g of $H_2O_2$ was added to the prepared 1620 cc of slurry. The $H_2O_2$-containing aqueous solution was added not in one portion but continuously over 6.5 hours. The resultant leach residue and the chlorination leach solution were subjected to filtration to separate the leach residue from the leach solution after finishing leach of the de-copperized anode slime.

Subsequently, 600 cc of diluted hydrochloric acid solution (HCl: 1.5N) and 3350 cc of water were used to wash the leach residue. The resultant leach residue was in an amount of 908 g.

Step 2. With 304 g of the chlorination leach residue (a part of the resultant residue of step 1), 108 g of $Na_2CO_3$ and 1300 cc of water were mixed for de-chlorine leaching. The dechlorine leach residue was washed with 1500 cc of hot water (70° C.) and 500 cc of water. The de-chlorine leach residue and the washing liquor were filtrated and separated from one another after washing.

Step 3. The de-chlorine leach residue (374 g in wet amount) was leached with 1500 cc of ammonia solution (257 g of ammonia contained) and 2000 cc of water at ambient temperature. The resultant slurry was separated into 4000 cc of ammonia solution (containing 500 cc of washing water) and leach residue that was subsequently washed with 300 cc of water.

Step 4. 515 cc of sulfuric acid solution, of which concentration of sulfuric acid was 1000 g/l, was added into 2000 cc of ammoniacal leach solution (a part of the solution gained in Step 3) to neutralize the solution and to form the precipitate of silver chloride. The precipitate was washed with 200 cc of water after separation. 79 g of silver shot was gained by melting the reduced silver.

Comparative Example 1

79 g of silver shot was gained according to the method mentioned in Example 1 with two different conditions. One was that heating of the ammoniacal leach solution was applied in Step 4 to distill and remove the ammonia from the solution instead of the neutralization. The other was that 400 cc of after was used in Step 5 instead of 700 cc of the washing water.

Comparative Example 2

Comparative Example 2 followed the method mentioned in Example 1 with some different conditions as below.

In Step 2, chlorination residue (a part of the residue weighing 400 g in wet amount, was produced in Step 1 of Example 1) was mixed with 108 g of sodium carbonate and 1300 cc of water to perform the de-chlorine leaching. The leach residue was separated and washed with 1500 cc of hot water (its temperature was 70° C.) and 500 cc of water. The residue was separated from washing solution by filtration.

In Step 3, the de-chlorine leach residue (374 g in wet amount) was pulped and leached in a solution of 1500 cc of ammonia solution (it contained 238 g of ammonia) and 2000 cc of water at ambient temperature. The resultant slurry was separated to its residue and 4400 cc of ammoniacal leach solution by filtration. The residue was washed with 600 cc of water.

In Step 4, 2200 cc of the ammoniacal leach solution, a part of that produced in Step 3 of Comparative Example 2, was neutralized with 515 cc of sulfuric acid solution (1000 g/l of sulfuric acid). Silver chloride was precipitated and washed with 200 cc of water after separation from the neutralized solution.

In Step 5, the silver chloride precipitate was mixed with 300 cc of hydrochloric acid solution (HCl: 6N) and 20 cc of hydrogen peroxide solution ($H_2O_2$: 7.2 g) was added to the slurry to perform the second chlorination leach. The resultant slurry was separated into its residue and the leach solution. The residue was washed with 200 cc of hydrochloric acid (HCl: 3N) and 700 cc of water.

Comparative Example 3

78 g of silver shot was gained through the method of Comparative Example 3 which followed the method of Comparative Example 2 with different condition in Step 4. The condition was that heating the ammonia solution which was a product of Step 3 was employed to distill and remove ammonia in the solution.

The analysis value of gold, palladium, coppler, lead and tellurium of the de-copperized anode slime, and the silver shots obtained in Example 1 and Comparative Examples 1 to 3 is shown in Table 1.

TABLE 1

| | Content of Impurities (ppm - #) | | | | |
|---|---|---|---|---|---|
| | Au | Pd | Cu | Pb | Te |
| De-copperized Anode Slime | 2.02 | 0.38 | 0.18 | 9.71 | 1.66 |
| Example 1 | <1 | <1 | <1 | <1 | <1 |
| Comparative Example 1 | 1 | <1 | 1 | 2 | 1 |
| Comparative Example 2 | <1 | <1 | 3 | 3 | <1 |
| Comparative Example 3 | 2 | 6 | 19 | 3 | 5 |

Remarks. # - The impurities content of the de-copperized anode slime is in unit of weight %.

As is apparent from Table 1, the respective content of all of the impurities is decreased to less than 1 ppm in Example 1, in which the following features (1) to (4) are fulfilled. (1) The dechlorination of the crude silver chloride is carried out at ambient temperature. (2) Subsequent to the dechlorination, the crude silver chloride is washed with hot water. (3) Instead of heating the ammonia leach solution to high temperature to remove ammonia in the solution, sulfuric acid is added to the ammoniacal leach solution to neutralize it. (4) Prior to converting silver chloride to silver oxide (I), hydrochloric acid and hydrogen peroxide are again used for chlorination leaching, and washing is then carried out.

As is described hereinabove, high-grade reduced silver is obtained by a simple process from the crude silver chloride, which is prepared by subjecting the de-copperized anode slime to the chlorination leaching.

I claim:

1. A method for producing high-grade reduced silver from a crude silver chloride, which is prepared by chlorination leaching of a de-copperized anode slime, comprising the steps of:

adding hydrochloric acid and hydrogen peroxide to a liquor which contains the de-copperized anode slime, and separating a first chlorination leach residue and a first chlorination leach solution from one another;

adding sodium carbonate to the first chlorination leach residue at ambient temperature, thereby dechlorinating the first chlorination leach residue and separating a dechlorinated residue and a leach solution from one another;

adding ammonia to the dechlorinated residue, and separating a leach residue and an ammoniacal leach solution from one another;

adding sulfuric acid to the ammoniacal leach solution to neutralize the ammoniacal-leach solution and precipitating mainly silver chloride;

adding hydrochloric acid and hydrogen peroxide to the precipitate, and separating a second chlorination-leach residue which essentially consists of silver chloride, and a second chlorination leach solution, from one another;

obtaining a slurry of the second chlorination-leach residue;

adding sodium hydroxide to the slurry of the second chlorination-leach residue to convert the silver chloride to silver oxide (I); and, adding a reductant, such as reducing sugar or hydrazine to reduce silver oxide (I) in the slurry to silver.

2. A method according to claim 1, further comprising a step of washing the dechlorinated residue with hot water prior to the ammonia adding step.

3. A method according to claim 1, wherein said sulfuric acid is added to reduce pH value of the solution to equal to or less than 7.

4. A method according to claim 1, 2 or 3 wherein said sodium carbonate adding step is carried out at ambient temperature.

5. A method according to any one of claim 1, 2 or 3, wherein said reductant is reducing sugar.

6. A method according to claim 1, 2 or 3, wherein said reductant is hydrazine.

* * * * *